April 27, 1965  J. C. OPOLKA  3,180,044
GUIDE MAP HOLDER
Filed Feb. 15, 1963
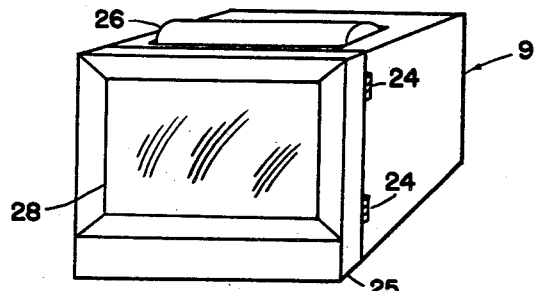
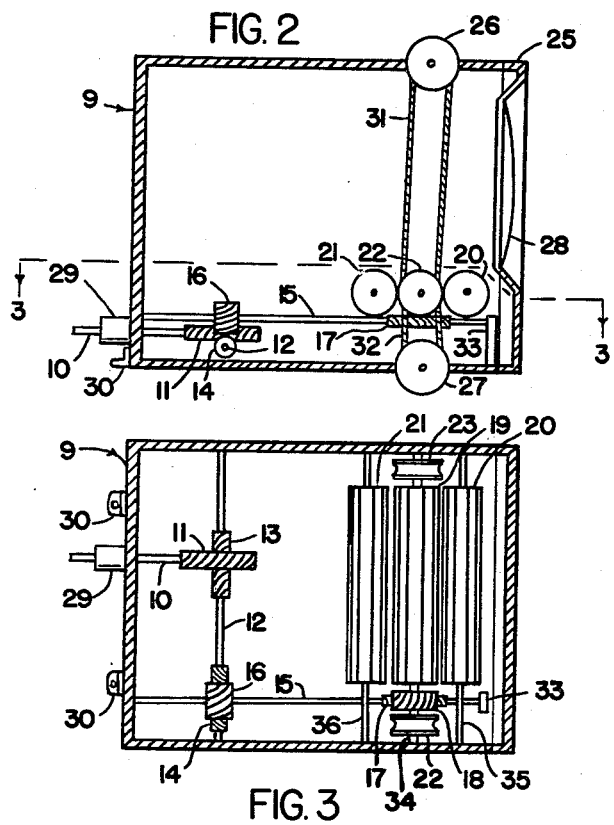
JOHN C. OPOLKA
*INVENTOR.*
BY  R. R. Kimpel
ATTORNEY 3,180,044
GUIDE MAP HOLDER
John C. Opolka, 1005 W. Springfield, Urbana, Ill.
Filed Feb. 15, 1963, Ser. No. 258,778
1 Claim. (Cl. 40—42)

This invention relates to new and useful improvements in a guide map holder to assist the driver of an automobile in following a given route. It has as one object to provide an improved device which may be mounted on the steering column or dash board of an automobile, or any other appropriate location in a vehicle where it can be readily observed by the person driving the car without necessitating distraction of the driver from normal driving duties.

Another object is to provide a device of this character which incorporates means for holding continuous strip maps within the device itself in a position such that the area actually being traversed by the vehicle is displayed in the lens of the device.

Another object is to provide a device of this character which incorporates means for reversing the continuous film strip so that it may be run through the device in either of two directions thus allowing the use of the same continuous map for the same trip regardless of which end of the area traversed is the starting point or the terminal point. It is a still further object of this invention to provide a device of the character described which incorporates means for synchronizing the speed of the continuous strip of map through the device with the speed of the vehicle of which it is used.

Further objects and values will become apparent from a consideration of the accompanying description in connection with the drawing which:

FIGURE 1 is a front perspective view of the guide map holder;

FIGURE 2 is a side elevation cross section of the guide map holder;

FIGURE 3 is a plan view cross section taken substantially along line 3—3 of FIGURE 2.

Referring now more particularly to the drawings wherein I have disclosed a preferred embodiment of the invention, the number 9 in FIGURE 1 indicates generally the guide map holder. Referring further to FIGURE 1 it will be seen that guide map holder 9 has incorporated at its front portion a front door 25 which is hinged to the remainder of the case by hinges 24. The front door 25 incorporates a glass lens 28. The top spool 26 also can be seen in FIGURE 1 which is mounted in the top of the guide map holder 9 and is adapted to serve as a spool for storing a continuous strip map.

Referring now to FIGURE 2 which is a side elevation view of the guide map holder with some sections removed for clarity, it will be seen that a connecting shaft 10 is provided which is adapted to be connected by a suitable means to the standard head of a common automobile speedometer cable. Shaft 10 is journaled in a bearing 29 which is fixedly attached to the guide map holder 9 and forms a part thereof. Mounted on the shaft 10 is worm gear 11. Worm gear 11 is adapted to engage gear 13 which is mounted on shaft 12, gear 13 not being visible in FIGURE 2 but is clearly seen in FIGURE 3. Gear 13 is mounted on shaft 12 which is rotatably mounted in bearings fixed in the housing of the guide map holder 9. Also mounted on shaft 12 is worm gear 14 which is adapted to engage wheel gear 16 which in turn is mounted on shaft 15. Shaft 15 in turn is supported by bearings incorporated at one end of the guide map holder 9 and at the other end by support 33. Also mounted on shaft 15 is worm gear 17 which is adapted to engage wheel gear 18, which is not visible in FIGURE 2 but is seen in FIGURE 3. Wheel gear 18 is mounted on shaft 34 as is drive roller 19 which is not visible in FIGURE 2 but can be seen in FIGURE 3. Shaft 34 is supported by bearings which are not shown but are incorporated in the guide map holder 9. The drive roller 19 is formed from a resilient material such as rubber or other suitable material. Mounted in the same plane with roller 19 are rollers 20 and 21 mounted respectively on shafts 35 and 36 which are supported, as is shaft 34, by bearings in the guide map holder 9. Rollers 19, 26, and 21 are co-planar and are also in contact with each other. Also mounted on shaft 34 are pulleys 22 and 23, only pulley 22 being visible in FIGURE 2. Pulley 23 is shown in FIGURE 3.

Pulleys 22 and 23 are adapted to receive spring-chain 31 and 32 which are shown in FIGURE 2 but have not been shown in FIGURE 3 for the purpose of clarity.

In operation a continuous strip map such as those commonly known in the art, is selected which is adapted to be wound on the spool 26 as is shown in FIGURES 1 and 2. The front door 25 is open so that the continuous strip map can be fed down between rollers 19 and 20 and its end engaged upon roller spool 27.

As the vehicle begins to move the speedometer cable drives connecting shaft 10 which through worm gear 11 turns gear 13 which in turn drives shaft 12 and worm gear 14. Worm gear 14 is engaged with wheel gear 16 and in turn drives shaft 15 and worm gear 17, which in turn drives wheel gear 18 and shaft 34. The continuous strip map being held firmly between drive roller 19 and roller 20 will be continuously fed downward onto spool 27. At the same time spool 27 will be driven at the approximate same speed as drive roller 19 by means of spring-chain 32 which is in place on pulley 22 and a similar pulley on lower spool 27.

Through the gear arrangement just described the continuous strip map will be advanced at the same rate that the vehicle travels over land by virtue of the suitable selection of the proper scale in the continuous strip map.

When the end of the route shown on the continuous strip map has been reached and the entire map is on the roller spool 27 the foregoing procedure can be reversed merely by feeding the end of the continuous strip map from spool 27 upward between drive roller 19 and roller 21. This in effect without changing the rotation of the gears or spools in the device effectively reverses the direction of the continuous strip map so that it may be fed upward between drive roller 19 and roller 21 back onto the upper spool 26. Spool 26 will be driven at the approximate same speed as drive roller 19 by means of spring-chain 31 which passes over pulley 23 and a similar pulley on the upper spool 26.

Thus it will be seen that an effective and simple means of providing a synchronized continuous film strip adapted to advance at an identical rate to the progress of the vehicle over the ground has been described. Further a simple and effective means of reversing the direction of travel on the continuous strip map has been shown which eliminates the difficulty and inconvenience of having separate spools covering the same route and also the necessity of rewinding spools with the continuous strip maps.

The guide map holder may be mounted in any suitable location within the vehicle with which it is to be used by means of brackets 30 which are shown in FIGURE 2 and FIGURE 3. It can be seen that the holder can be mounted on the steering column or it may be mounted on the dash board of the vehicle toward the center where it will be visible by all the occupants of the front seat of the vehicle thus affording assistance by persons other than the driver in navigation. It will be seen that the unit can be very easily mounted and dismounted merely by attaching the units by brackets 30 in the appropriate part of the vehicle and connecting the speedometer head cable to the connecting drive 10.

The continuous strip map may be adapted to provide pictures of local interest in the area in which it portrays such as historical markers, recreation facilities and eating and lodging accommodations. The continuous strip map may be a film strip or a strip of any suitable material such as white paper, incorporating upon it the selected suitable indications or route numbers, fueling facilities, and any other desired information.

While the foregoing description sets forth the invention in specific terms it is to be understood that various and numerous changes in the shape, size and materials may be made without departing from the spirit and scope of the invention as claimed.

I claim:

A guide map holder comprising a rectangular box-like enclosure having a front door, a transparent lens mounted in said front door, an upper spool mounted in the upper part of said holder and a lower spool mounted in the lower part of said holder, said spools adapted to receive and hold a continuous strip map, means for propelling a continuous strip map in selective directions through said holder and winding said map on one of said spools, said last mentioned means comprising a drive roller and two co-planar rollers frictionally engaging said drive roller and adapted to receive a continuous strip map selectively therebetween, flexible spring-chain means connecting said drive roller and said spools and operative to allow some variation in respective speed of said upper and lower spools, and gear means connecting said drive roller to a speedometer cable operative to drive said drive roller at a rate directly proportional to the speed of a vehicle in which said guide map holder is mounted.

References Cited by the Examiner
UNITED STATES PATENTS

| | | | |
|---|---|---|---|
| 1,457,358 | 6/23 | Fulton | 40—42 |
| 1,532,731 | 4/25 | Coleman | 40—42 |
| 1,569,946 | 1/26 | Buettner et al. | 40—42 |
| 2,133,753 | 10/38 | Nichols | 40—42 |
| 3,045,937 | 7/62 | Johnson | 242—55.12 |
| 3,099,397 | 7/63 | Abbott | 242—55.12 |

JEROME SCHNALL, *Primary Examiner.*